United States Patent
Niimoto

(10) Patent No.: US 11,390,760 B2
(45) Date of Patent: Jul. 19, 2022

(54) COATING COMPOSITION, PRIMER COATING FILM, LAMINATED ANTIFOULING COATING FILM, METHOD FOR MANUFACTURING SUBSTRATE WITH PRIMER COATING FILM, AND METHOD FOR MANUFACTURING SUBSTRATE WITH LAMINATED ANTIFOULING COATING FILM

(71) Applicant: CHUGOKU MARINE PAINTS, LTD., Otake (JP)

(72) Inventor: Jyunji Niimoto, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 389 days.

(21) Appl. No.: 16/085,396

(22) PCT Filed: Mar. 15, 2017

(86) PCT No.: PCT/JP2017/010453
§ 371 (c)(1),
(2) Date: Sep. 14, 2018

(87) PCT Pub. No.: WO2017/159740
PCT Pub. Date: Sep. 21, 2017

(65) Prior Publication Data
US 2019/0085177 A1    Mar. 21, 2019

(30) Foreign Application Priority Data
Mar. 16, 2016    (JP) .............................. JP2016-052928

(51) Int. Cl.
*C09D 5/16*    (2006.01)
*C09D 163/00*    (2006.01)
(Continued)

(52) U.S. Cl.
CPC ............ *C09D 5/1675* (2013.01); *B32B 27/38* (2013.01); *C08K 5/541* (2013.01); *C09D 5/00* (2013.01);
(Continued)

(58) Field of Classification Search
CPC ........ C09D 5/002; C09D 5/16; C09D 5/1693; C09D 163/00; C09D 5/1675; C09D 5/00;
(Continued)

(56) References Cited

U.S. PATENT DOCUMENTS 4,431,756 A    2/1984    Andrews
5,087,647 A *  2/1992    Flakus ................. C09D 163/00
                                              523/412
(Continued)

FOREIGN PATENT DOCUMENTS

CN    104610845 A    5/2015
CN    104789090 A    7/2015
(Continued)

OTHER PUBLICATIONS

Machine translation of JP 2008075033 A, retrieved from patents.google.com (Year: 2008).*

(Continued)

*Primary Examiner* — John D Freeman
(74) *Attorney, Agent, or Firm* — Oblon, McClelland, Maier & Neustadt, L.L.P.

(57) ABSTRACT

The present invention relates to a coating composition, a primer coating film, a layered antifouling coating film, a method of producing a substrate with a primer coating film, and a method of producing a substrate with a layered antifouling coating film. The coating composition includes an epoxy resin (A), an amine curing agent (B), a silane coupling agent (C), water (D), and a pigment (E). In the coating composition, the content of the water (D) is 3.5 to 11

(Continued)

SEMI-CURING 10        COMPLETE-CURING 20 parts by weight with respect to 100 parts by weight of non-volatile content in the coating composition, and a pigment volume concentration of the coating composition is 37 to 47%.

10 Claims, 1 Drawing Sheet

(51) Int. Cl.
| | | |
|---|---|---|
| *C09D 5/00* | (2006.01) | |
| *B32B 27/38* | (2006.01) | |
| *C09D 7/40* | (2018.01) | |
| *C09D 7/63* | (2018.01) | |
| *C08K 5/541* | (2006.01) | |
| *C09D 183/04* | (2006.01) | |

(52) U.S. Cl.
CPC .............. *C09D 7/40* (2018.01); *C09D 7/63* (2018.01); *C09D 163/00* (2013.01); *C09D 183/04* (2013.01)

(58) Field of Classification Search
CPC .......... C09D 7/40; C09D 7/63; C09D 183/04; C09G 59/50; B32B 27/38; C08K 5/541; B05D 7/14; B05D 7/52
See application file for complete search history.

(56) References Cited

U.S. PATENT DOCUMENTS

| | | | |
|---|---|---|---|
| 6,338,869 B1* | 1/2002 | Nakano | C08G 59/50 427/140 |
| 6,451,437 B1 | 9/2002 | Amidaiji et al. | |
| 2002/0197490 A1 | 12/2002 | Amidaiji et al. | |
| 2005/0014004 A1 | 1/2005 | King et al. | |
| 2005/0120671 A1* | 6/2005 | Rooshenas | C04B 26/14 52/747.11 |
| 2005/0129962 A1 | 6/2005 | Amidaiji et al. | |
| 2007/0100074 A1* | 5/2007 | Devonport | C09D 133/068 525/107 |
| 2009/0029173 A1* | 1/2009 | Schramm | C09D 5/106 428/413 |
| 2011/0027591 A1 | 2/2011 | Braun et al. | |
| 2015/0096680 A1 | 4/2015 | Zhao et al. | |
| 2015/0368506 A1 | 12/2015 | Niimoto | |

FOREIGN PATENT DOCUMENTS

| | | |
|---|---|---|
| CN | 105885621 A | 8/2016 |
| JP | 58-91720 A | 5/1983 |
| JP | 11-242111 A | 9/1999 |
| JP | 2001-139816 A | 5/2001 |
| JP | 2001-181509 A | 7/2001 |
| JP | 2007-504354 A | 3/2007 |
| JP | 2008-75033 A | 4/2008 |
| JP | 2013-100522 A | 5/2013 |
| JP | 2014-148639 A | 8/2014 |
| WO | WO 2011/118792 A1 | 9/2011 |
| WO | WO 2014/119741 A1 | 8/2014 |

OTHER PUBLICATIONS

Partial Translation of JP 2008-75033. 1 page. (Year: 2022).*
International Search Report dated May 23, 2017 in PCT/JP2017/010453, 2 pages.
Office Action dated Jul. 2, 2019 in Japanese Patent Application No. 2018-505982.
Extended European Search Report dated Sep. 27, 2019 in European Patent Application No. 17766736.7, 6 pages.
Watkins, M. J. et al. "Formulating High-Performance Waterborne Epoxy Coatings", Thermoset Resin Formulators Association 2006 Annual Meeting, XP055444994, Sep. 2006, 28 pages.
Galgoci, E. C. et al. "High Performance Waterborne Coatings Based on Dispersions of a Solid Epoxy Resin and an Amine-Functional Curing Agent", Journal of Coatings Technology, XP55623958, vol. 71, No. 4, Apr. 1999, pp. 45-52.
Combined Chinese Office Action and Search Report dated Feb. 3, 2020, in Patent Application No. 201780016839.6, 10 pages (with English Translation of Category of Cited Documents).

* cited by examiner

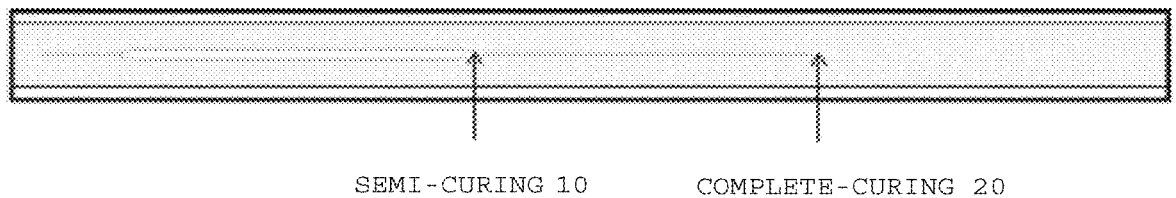

COATING COMPOSITION, PRIMER COATING FILM, LAMINATED ANTIFOULING COATING FILM, METHOD FOR MANUFACTURING SUBSTRATE WITH PRIMER COATING FILM, AND METHOD FOR MANUFACTURING SUBSTRATE WITH LAMINATED ANTIFOULING COATING FILM

TECHNICAL FIELD

The present invention relates to a coating composition, a primer coating film, a layered antifouling coating film, a method of producing a substrate with a primer coating film, and a method of producing a substrate with a layered antifouling coating film.

BACKGROUND ART

The materials of most of ship propellers (hereinafter also simply referred to as "propellers") are nonferrous metals such as copper compounds such as brass, or stainless steel. The exposure of the surfaces of the propellers in seawater for a long period has allowed various aquatic organisms such as animals such as oyster, mussel, and barnacle, plants such as laver, and bacterias to adhere to the surfaces and to propagate, thereby resulting in problems such as decreases in propulsive powers generated by the propellers and corrosion due to seawater components.

Examples of methods for preventing, for example, the adhesion and propagation of the various aquatic organisms include a method of applying an antifouling coating to a propeller surface to form an antifouling coating film; however, since nonferrous metals and stainless steel are metals on the surfaces of which oxide films are formed, and which have low surface activity, it has been difficult to allow antifouling coating films to firmly adhere to the propellers. Thus, a primer layer is typically disposed between both a propeller and such an antifouling coating film in order to enhance adhesion between the propeller and the antifouling coating film.

It is also necessary for the primer layer to endure high shearing force applied to a high-speed rotating propeller. An etching primer in which vinyl butyral resin is used as a binder, a chromium compound (zinc chromate) and phosphoric acid are used, and adhesion is secured by oxidation of zinc chromate has been conventionally used as a coating for forming such a primer layer. However, the influence (carcinogenicity) of zinc chromate on the human body has been perceived as a problem, and it has been desired to develop a chromium compound (zinc chromate)-free coating.

Against the problem, the present applicant has reported that use of a two-component primer comprising an epoxy resin, a certain curing agent, gypsum, and a pigment enables the formation of a primer coating film having favorable adhesion to a propeller and excellent curability (Patent Literature 1).

CITATION LIST

Patent Literature

Patent Literature 1: JP 2014-148639 A

SUMMARY OF INVENTION

Technical Problem

The primer described in the patent document may have an insufficient drying property, may have insufficient coating film hardness in the case of drying the primer at a low temperature (for example, 5° C.), and was also room for improvement in view of the adhesion of an obtained coating film to a stainless steel substrate.

An object of one embodiment of the present invention is to provide a chromium compound-free coating composition that has an excellent drying property and that enables the formation of a coating film having excellent adhesion to a substrate, particularly a nonferrous metal and stainless steel (hereinafter also collectively referred to as "e.g. nonferrous metal") and having high hardness even under low-temperature dry conditions.

Solution to Problem

Under such circumstances, as a result of intensive examination for solving the problems, the present inventors found that the problems can be solved by a coating composition in which an epoxy resin, a curing agent, and a certain amount of a pigment, as well as a silane coupling agent and a certain amount of water are used, and the present invention was thus accomplished.

Configuration examples of the present invention are as follows.

[1] A coating composition comprising an epoxy resin (A), an amine curing agent (B) (an amine-based curing agent (B)), a silane coupling agent (C), water (D), and a pigment (E),
wherein a content of the water (D) is 3.5 to 11 parts by weight with respect to 100 parts by weight (of non-volatile content) in the coating composition, and a PVC (pigment volume concentration) of the coating composition is 37 to 47%.

[2] The coating composition according to [1], wherein the silane coupling agent (C) is a silane coupling agent having an epoxy group or an amino group.

[3] The coating composition according to [1] or [2], comprising 0.1 to 10% by weight of the silane coupling agent (C) with respect to 100% by weight of the non-volatile content in the coating composition.

[4] The coating composition according to any one of [1] to [3], wherein the amine curing agent (B) comprises a Mannich modified product.

[5] The coating composition according to any one of [1] to [4], further comprising a curing accelerator (F).

[6] The coating composition according to any one of [1] to [5], for use in a nonferrous metal or stainless steel substrate.

[7] A primer coating film (P) produced using the coating composition according to any one of [1] to [6].

[8] A layered antifouling coating film comprising the primer coating film (P) according to [7] and an antifouling coating film (Q) formed on the primer coating film (P).

[9] The layered antifouling coating film according to [8], wherein the antifouling coating film (Q) is a silicone resin antifouling coating film (a silicone resin-based antifouling coating film).

[10] A method of producing a substrate with a primer coating film, the method comprising a step of forming a primer coating film (P) on a surface of a substrate from the coating composition according to any one of [1] to [5].

[11] A method of producing a substrate with a layered antifouling coating film, the method comprising: a step of forming a primer coating film (P) on a surface of a substrate from the coating composition according to anyone of [1] to [5]; and a step of forming an antifouling coating film (Q) on the primer coating film (P).

[12] The production method according to [11], wherein the antifouling coating film (Q) is a silicone resin antifouling coating film.

[13] The production method according to any one of [10] to [12], wherein the substrate is a nonferrous metal or stainless steel.

[14] The production method according to any one of [10] to [13], wherein the substrate is a ship propeller.

Advantageous Effects of Invention

The coating composition which is one embodiment of the present invention is a chromium compound-free composition having an excellent drying property. The composition enables the formation of a coating film having excellent adhesion to a substrate, particularly e.g. nonferrous metal, and having high hardness even under low-temperature dry conditions, and further enables the formation of a coating film also having excellent adhesion to a top coating film.

According to one embodiment of the present invention, there can be provided a layered antifouling coating film excellent in the balance of, for example, adhesion to a substrate, particularly e.g. nonferrous metal, hardness, a long-term anticorrosion property and a long-term antifouling property.

BRIEF DESCRIPTION OF DRAWINGS

FIG. 1 is a schematic view illustrating a semi-curing time and a complete-curing time in a drying property test in Examples.

DESCRIPTION OF EMBODIMENTS

«Coating Composition»

A coating composition according to one embodiment of the present invention (hereinafter also simply referred to as "present composition") is a composition containing an epoxy resin (A), an amine curing agent (B), a silane coupling agent (C), water (D), and a pigment (E), in which the content of the water (D) is 3.5 to 11 parts by weight with respect to 100 parts by weight of the composition (non-volatile content), and PVC (pigment volume concentration) is 37 to 47%.

The present composition is a chromium compound-free composition having an excellent drying property. The composition enables the formation of a coating film having excellent adhesion to a substrate, particularly e.g. nonferrous metal, and further a propeller, and having high hardness even under low-temperature dry conditions, and further enables the easy formation of a coating film, specifically a primer coating film having an excellent anticorrosion property and excellent adhesion to a top coating film.

In particular, the present composition exhibits a prominent effect of an excellent drying property, particularly an excellent low-temperature drying property, although containing a certain amount of water.

A propeller rolls up marine debris, thereby easily being damaged, or easily undergoes cavitation due to bubbles generated by high-speed rotation. A coating film formed on the propeller requires, for example, tough adhesion, high coating film hardness and impact resistance. The coating film formed on a propeller surface is typically formed by being naturally dried without being force-dried by, for example, heating or air-blowing after coating. In view of, for example, workability and a cost, the obtained propeller is often used without a lapse of long time after the coating. As described above, in the case of using the propeller immediately after the coating, the propeller undergoes strong water flow due to rotation and a high pressure due to cavitation. Therefore, a composition forming the coating film requires a short drying time, and the coating film formed on the propeller surface requires excellent hardness in an early stage after the coating. In particular, a coating film is formed on a propeller even in winter, and therefore, it is necessary that a coating film having such characteristics can be formed even under low temperature.

It is desirable that the obtained coating film further has favorable adhesion to a silicone resin antifouling coating film which is often overcoated for, for example, an antifouling property and cavitation resistance.

The present composition is a composition that sufficiently satisfies such requirements. The composition enables the easy formation of a coating film that sufficiently satisfies the requirements.

In addition, the present composition enables the formation of a coating film exhibiting the effects even if containing no chromium compound, and is therefore a composition excellent in coating application safety and environmental safety.

In light of, for example, the above, the present composition can be preferably used as a primer for coating e.g. nonferrous metal, particularly a propeller.

<Epoxy Resin (A)>

The epoxy resin (A) is preferred because of exhibiting strong adhesion to a substrate with which the epoxy resin (A) comes in contact, being excellent in, for example, mechanical properties, and being easily cured by using a curing agent described later.

Such epoxy resins (A) may be used singly or two or more kinds thereof.

The epoxy resin (A) is not particularly limited unless the effects of the present invention are deteriorated, and examples thereof include a polymer or an oligomer containing two or more epoxy groups in the molecule. Examples of such epoxy resins include bisphenol type epoxy resins, glycidyl ester type epoxy resins, glycidyl amine type epoxy resins, novolac type epoxy resins (for example, phenol novolac type epoxy resins and cresol novolac type epoxy resins), fatty acid modified epoxy resins, aliphatic epoxy resins, alicyclic epoxy resins, and epoxidized oil type epoxy resins.

Of these, bisphenol type epoxy resins and/or novolac type epoxy resins are preferred in view of easy obtaining a coating film excellent in, for example, adhesion to a substrate (particularly, e.g. nonferrous metal) and anticorrosion property, and bisphenol A type epoxy resins are further preferred in view of, for example, obtaining a composition having an excellent drying property, and obtaining a coating film superior in hardness and impact resistance. It is particularly preferable to use bisphenol type epoxy resins and novolac type epoxy resins in combination because a composition superior in drying property and a coating film superior in hardness are obtained by using novolac type epoxy resins.

It is desirable that the epoxy resin (A) preferably has an epoxy equivalent per solid content (hereinafter also simply referred to as "epoxy equivalent") in a range of 160 to 700 g/eq, more preferably 200 to 550 g/eq, in view of, for example, obtaining a coating film superior in hardness and adhesion to a substrate (particularly, e.g. nonferrous metal).

Examples of commercially available products of the bisphenol type epoxy resins include "jER-828" (an epoxy equivalent of 180 to 190 g/eq) as a commercially available product which is liquid at ordinary temperature (5 to 35° C., in conformity with JIS Z 8703, hereinafter the same applies), "jER-834-X90" (a solid content of 90% and an epoxy equivalent of 230 to 270 g/eq) as a commercially available product which is semi-solid at ordinary temperature, and "jER-1001-X75" (a solid content of 75% and an epoxy equivalent of 450 to 500 g/eq) as a commercially available product which is solid at ordinary temperature. Each of the commercially available products is manufactured by Mitsubishi Chemical Corporation. Examples of commercially available products of the novolac type epoxy resins include "Epiclon 5300-70" (manufactured by DIC Corporation, a solid content of 70%, an epoxy equivalent of 300 to 340 g/eq).

It is desirable to contain the epoxy resin (A) in an amount of preferably 0.1 to 50% by weight, more preferably 5 to 50% by weight, and still more preferably 10 to 40% by weight with respect to 100% by weight of the non-volatile content in the present composition. The amount of the blended epoxy resin (A) in the range is preferred because of resulting in the obtainment of a composition superior in coating workability and levelling property, and in the obtainment of a coating film having more favorable adhesion to a substrate (particularly, e.g. nonferrous metal), toughness, and flexibility.

In the case of using two or more kinds of epoxy resins (A), the total amount of the epoxy resins used is also preferably in the range.

When (i) a bisphenol type epoxy resin and (ii) a novolac type epoxy resin are used in combination as described above, the use ratio thereof ((i):(ii)) is, in weight ratio, preferably 100:30 to 300, more preferably 100:50 to 200, and still more preferably 100:60 to 150 in view of, for example, obtaining a coating film superior in coating film hardness and impact resistance.

<Amine Curing Agent (B)>

The amine curing agent (B) is not particularly limited, and examples thereof include amine curing agents such as aliphatic amines, alicyclic amines, aromatic amines, aliphatic amines having aromatic ring(s), and heterocyclic amines, as well as modified products thereof.

One kind of such amine curing agents (B) may be used singly, or two or more kinds thereof may be used.

Examples of the aliphatic amines include alkyl monoamines, alkylene polyamines, polyalkylene polyamines, and alkylaminoalkyl amines.

Examples of the alkylene polyamines include compounds represented by Formula: "$H_2N-(CH_2)_n-NH_2$" (n represents an integer 1 to 12, and an optional hydrogen atom of $-(CH_2)_n-$ may be substituted with a hydrocarbon group having 1 to 10 carbon atoms), and specifically include methylene diamine, ethylene diamine, 1,2-diaminopropane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and trimethyl hexamethylene diamine.

Examples of the polyalkylene polyamines include compounds represented by Formula: "$H_2N-(C_mH_{2m}NH)_nH$" (m represents an integer 1 to 10. n represents an integer 2 to 10, preferably 6), and specifically include diethylenetriamine, dipropylenetriamine, triethylenetetramine, tripropylenetetramine, tetraethylenepentamine, tetrapropylenepentamine, pentaethylenehexamine, nonaethylenedecamine, and bis(hexamethylene)triamine.

Examples of aliphatic amines other than them include tetra(aminomethyl)methane, tetrakis(2-aminoethylaminomethyl)methane, 1,3-bis(2'-aminoethylamino)propane, 2,2'-[ethylenebis(iminotrimethyleneimino)]bis(ethanamine), tris(2-aminoethyl)amine, and bis(cyanoethyl)diethylenetriamine.

Examples of the alicyclic amines include 1,4-cyclohexanediamine, 4,4'-methylenebis(cyclohexaneamine), 4,4'-isopropylidenebis(cyclohexaneamine), norbornanediamine, bis(aminomethyl)cyclohexane, isophoronediamine, and menthenediamine (MDA).

Examples of the aromatic amines include aromatic polyamine compounds having two or more primary amino groups bound to an aromatic ring.

More specific examples of the aromatic amines include phenylenediamine, naphthylenediamine, diaminodiphenylmethane, 2,2-bis(4-aminophenyl)propane, 4,4'-diaminodiphenylether, 4,4'-diaminobenzophenone, 4,4'-diaminodiphenylsulfone, 2,2'-dimethyl-4,4'-diaminodiphenylmethane, 2,4'-diaminobiphenyl, 2,3'-dimethyl-4,4'-diaminobiphenyl, and 3,3'-dimethoxy-4,4'-diaminobiphenyl.

Examples of the aliphatic amines having aromatic ring(s) include bis(aminoalkyl)benzene and bis(aminoalkyl)naphthalene.

More specific examples of the aliphatic amines having aromatic ring(s) include o-xylylenediamine, m-xylylenediamine (MXDA), p-xylylenediamine, bis(aminomethyl)naphthalene, and bis(aminoethyl)naphthalene.

Examples of the heterocyclic amines include N-methylpiperazine, morpholine, 1,4-bis-(3-aminopropyl)piperazine, 1,4-diazacycloheptane, 1-(2'-aminoethylpiperazine), 1-[2'-(2''-aminoethylamino)ethyl]piperazine, 1,11-diazacycloeicosane, and 1,15-diazacyclooctacosane.

Examples of other amine curing agents (B) include amines (amine compounds) described in JP S49-48480 B and polyether diamine.

Examples of the amine curing agents (B) further include modified products of the amine curing agents described above, such as fatty acid-modified products (polyamideamines), epoxy resin adduct-modified products, Mannich modified products (including, for example, phenalkamine and phenalkamide), Michael adducts, ketimine, aldimine, and urethane modified products, and Mannich modified products are preferred.

Among the amine curing agent (B), Mannich modified products obtained by subjecting phenols such as cardanol, aldehydes such as formaldehyde, and the above-described amine curing agents to Mannich condensation are preferred, and Mannich modified products of aliphatic amines having aromatic ring(s) are more preferred.

Use of such a Mannich modified product is preferred because of resulting in the obtainment of a composition having an excellent drying property, particularly an excellent low-temperature drying property, and in the obtainment of a coating film excellent in the balance of, for example, adhesion to a substrate (particularly, e.g. nonferrous metal) and hardness.

In particular, use of MXDA Mannich modified amine using m-xylylenediamine as the amine curing agent (B) as such an aliphatic amine having aromatic ring(s) results in the obtainment of a coating composition superior in drying property and in the obtainment of a coating film excellent in coating film hardness.

In the case of the Mannich condensation, for example, a phenol, an aldehyde, and an amine curing agent may be used theoretically in equimolar amounts. Typically, the aldehyde in an amount of 0.5 to 2.5 mol and the amine curing agent in an amount of 0.5 to 2.5 mol with respect to 1 mol of the phenol may be used and heated at a temperature of around 50 to 180° C. for around 3 to 12 hours. After the reaction, the reaction product may be heated under reduced pressure to remove water and an unreacted material.

It is desirable that the amine curing agent (B) preferably has an active hydrogen equivalent per solid content (hereinafter also simply referred to as "active hydrogen equivalent") in a range of 50 to 500 g/eq, and more preferably 70 to 400 g/eq, in view of, for example, obtaining a composition having an excellent drying property and obtaining a coating film excellent in the balance of coating film hardness and adhesion to a substrate (particularly, e.g. nonferrous metal).

Examples of commercially available products of the amine curing agent (B) include "MAD-204 (A)" (manufactured by OHTAKE MEISHIN CHEMICAL, CO., LTD., Mannich modified product of m-xylylenediamine, a solid content of 65%, an active hydrogen equivalent of 110 to 150 g/eq), "Luckamide V6-221" (manufactured by DIC Corporation, Mannich modified product of m-xylylenediamine, an active hydrogen equivalent of 80 g/eq), "Ancamine 2143" (manufactured by Air Products and Chemicals, Inc., epoxy resin adduct modified product of 4,4'-methylenebiscyclohexylamine, an active hydrogen equivalent of 115 g/eq), "Ancamine 2074" (manufactured by Air Products and Chemicals, Inc., epoxy resin adduct modified product of isophoronediamine, an active hydrogen equivalent of 92 g/eq), "Luckamide TD-966" (manufactured by DIC Corporation, polyamideamine, a solid content of 60%, an active hydrogen equivalent of 200 to 250 g/eq), and "Cardolite NX-4918" (manufactured by Cardolite Corporation, epoxy resin adduct modified product of phenalkamine, a solid content of 80%, an active hydrogen equivalent of 180 to 220 g/eq).

In the present composition, the amine curing agent (B) is contained in an amount in which a reaction ratio calculated from the following Equation [1] is preferably 0.5 to 1.0, and more preferably 0.5 to 0.9. When the content of the amine curing agent (B) is adjusted so that the reaction ratio is in the range, a coating composition superior in drying property is obtained, and a coating film superior in adhesion to a substrate (particularly, e.g. nonferrous metal) and coating film hardness is obtained.

$$\text{Reaction ratio} = \frac{\frac{\text{amount of blended amine curing agent }(B)}{\text{active hydrogen equivalent of amine curing agent }(B)} + \frac{\text{amount of blended other components having reactivity with epoxy resin }(A)}{\text{functional group equivalent of other components having reactivity with epoxy resin }(A)}}{\frac{\text{amount of blended epoxy resin }(A)}{\text{epoxy equivalent of epoxy resin }(A)} + \frac{\text{amount of blended other components having reactivity with amine curing agent }(B)}{\text{functional group equivalent of other components having reactivity with amine curing agent }(B)}} \quad [1]$$

Here, "other components having reactivity with epoxy resin (A)" and "other components having reactivity with amine curing agent (B)" in the above Equation [1] refer to components having functional group(s) (hereinafter also referred to as "reactive group(s)") being able to react with the epoxy resin (A) and the amine curing agent (B), respectively, specifically components such as the silane coupling agent (C) described later, and an acrylic ester which is a curing accelerator (E). In addition, "functional group equivalent of other component" means the mass (g) of 1 mol of the component per functional group.

For example, when a silane coupling agent having an amino group or an epoxy group as a reactive group is used as the silane coupling agent (C) as described below, it is determined whether the silane coupling agent (C) has reactivity with the epoxy resin (A) or reactivity with the amine curing agent (B) depending on the kind of the reactive group, and a reaction ratio is calculated from the above Equation [1].

<Silane Coupling Agent (C)>

Use of the silane coupling agent (C) together with other components, particularly a predetermined amount of water, enables not only prominent improvement in the adhesion of an obtained coating film to a substrate (particularly, e.g. nonferrous metal) but also improvement in the anticorrosion property of the obtained coating film.

One kind of the silane coupling agent (C) may be used singly, or two or more kinds thereof may be used.

The silane coupling agent (C) is preferably a compound having epoxy group (s) or amino group (s) in view of, for example, having excellent compatibility with the epoxy resin (A) or the amine curing agent (B), improving the dispersibility of the pigment (E) described later to enable the obtainment of a homogeneous coating film, and inhibiting a decrease in coating film hardness.

As the silane coupling agent (C), which is not particularly limited, a conventionally known compound can be used. The silane coupling agent (C) is preferably a compound that has at least two hydrolyzable groups in the same molecule and that can contribute to improvement in adhesion to a substrate, and more preferably a compound represented by Formula: X—SiMe$_n$Y$_{3-n}$ [X represents a reactive group (e.g., an amino group, a vinyl group, an epoxy group, a mercapto group, a halo group, or a group in which a hydrocarbon group is substituted with the group(s); and, for example, an ether bond may be present in the hydrocarbon group) that can react with organic matter, Y represents a hydrolyzable group (e.g., a methoxy group or an ethoxy group), n represents 0 or 1, and Me represents a methyl group].

Among such silane coupling agents, a compound in which X is an amino group or an epoxy group is preferred.

Examples of commercially available products of the silane coupling agent (C) include "KBM-403" (γ-glycidoxypropyltrimethoxysilane, an epoxy equivalent of 236 g/eq), "KBE-903" (γ-aminopropyltriethoxysilane, an active hydrogen equivalent of 111 g/eq), and "KBP-90" (aqueous aminosilane solution, a solid content of 32%, an active hydrogen equivalent of 100 to 140 g/eq). Each of the above is manufactured by Shin-Etsu Chemical Co., Ltd.

In the present composition, the content of the silane coupling agent (C) is preferably 0.1 to 10% by weight, and more preferably 0.5 to 5% by weight, with respect to 100% by weight of the non-volatile content in the composition. When the content of the silane coupling agent (C) is in the range, a coating film excellent in adhesion to a substrate (particularly, e.g. nonferrous metal) and adhesion to an antifouling coating film (Q) described later can be obtained.

<Water (D)>

The present composition contains 3.5 to 11 parts by weight, preferably 3.5 to 10.9 parts by weight, 3.5 to 10.8 parts by weight, 3.5 to 10.7 parts by weight, 3.5 to 10.6 parts by weight, 3.5 to 10.5 parts by weight, more preferably 5.5 to 10.5 parts by weight, particularly preferably 6 to 10 parts by weight, of the water (D) with respect to 100 parts by weight (of the non-volatile content) in the coating composition. A coating film that is prominently excellent in adhesion to a substrate (particularly, e.g. nonferrous metal) can be obtained by using a predetermined amount of the water (D) in combination with, for example, the silane coupling agent (C) as described above.

When the amount of the water (D) used is less than 3.5 parts by weight, the drying property of the composition is insufficient, and the adhesion of the obtained coating film to a substrate (particularly, e.g. nonferrous metal) is insufficient. When the amount is more than 11 parts by weight, the coating film formed from the coating composition is not a continuous and homogeneous coating film.

The present composition is a composition that particularly has an excellent drying property and enables the obtainment of a coating film that is particularly excellent in coating film hardness when containing the water (D) in an amount of more than 20 parts by weight with respect to 100 parts by weight of the epoxy resin (A).

<Pigment (E)>

The pigment (E) is not particularly limited, and examples thereof include extender pigments, coloring pigments, and anticorrosive pigments. The pigment (E) may be any of organic and inorganic pigments.

One kind of the pigment (E) may be used singly, or two or more kinds thereof may be used.

The present composition preferably contains an extender pigment in view of, for example, improvement in the physical properties of a coating film, such as adhesion to a substrate (particularly, e.g. nonferrous metal) and crack resistance.

Examples of the extender pigments include zinc oxide, talc, silica, mica, clay, potash feldspar, glass flake, calcium carbonate, kaolin, alumina white, white carbon, aluminum hydroxide, magnesium carbonate, barium sulfate (for example, barite powder), gypsum, and fibrous fillers such as rock wool and glass fibers. Of these, a pigment selected from the group consisting of talc, silica, mica, clay, calcium carbonate, kaolin, barium sulfate, potash feldspar, and gypsum is preferred.

A flaky pigment such as mica or glass flake is more preferably contained as such an extender pigment in view of, for example, reduction in the internal stress and improvement in adhesion to a substrate of the obtained coating film. Mica is more preferred because it is inexpensive, is excellent in availability and can form a coating film having superior effect of improving adhesion.

Anhydrous gypsum ($CaSO_4$) or hemihydrate gypsum ($CaSO_4.1/2H_2O$) is more preferably contained as the extender pigment in view of, for example, being able to obtain a coating film excellent in water resistance, salt water resistance, and anticorrosion property. In addition, anhydrous gypsum and hemihydrate gypsum have characteristics of being cured when adsorbing water and of retaining water. Accordingly, it is considered that a coating film containing anhydrous gypsum or hemihydrate gypsum retains water and has an action of reducing the internal stress of the coating film by a plasticity effect, and therefore, the adhesion of the coating film to a substrate (particularly, e.g. nonferrous metal) is improved.

The gypsum may be a natural product or an artificial product. The form of the gypsum is not particularly limited, but is preferably a powdery form.

The extender pigment is not particularly limited as long as being contained in the composition so that the PVC of the present composition is in a range described below. The extender pigment is preferably blended in an amount of 0.1 to 500 parts by weight, more preferably 50 to 400 parts by weight, with respect to 100 parts by weight of the epoxy resin (A).

The flaky pigment is not particularly limited as long as being contained in the composition so that the PVC of the present composition is in a range described below. The flaky pigment is preferably blended in an amount of 0.1 to 300 parts by weight, more preferably 30 to 100 parts by weight, with respect to 100 parts by weight of the epoxy resin (A), in view of, for example, obtaining a coating film excellent in adhesion to a substrate.

The gypsum is not particularly limited as long as being contained in the present composition so that the PVC of the present composition is in a range described below. The gypsum is preferably blended in an amount of 5 to 300 parts by weight, more preferably 5 to 200 parts by weight, with respect to 100 parts by weight of the epoxy resin (A), in view of, for example, the adhesion of an obtained coating film to a substrate.

Conventionally known, various organic and/or inorganic pigments can be used as the coloring pigment.

Examples of the organic pigments include naphthol red and phthalocyanine blue. Examples of the inorganic pigments include carbon black, red iron oxide, titanium white, yellow iron oxide (ocher), and aluminum powder.

The coloring pigment is not particularly limited as long as being contained in the present composition so that the PVC of the present composition is in a range described below. The coloring pigment is preferably blended in an amount of 0.01 to 200 parts by weight, more preferably 0.01 to 100 parts by weight, with respect to 100 parts by weight of the epoxy resin (A).

Examples of the anticorrosive pigment include molybdic acid type, phosphoric acid type, boric acid type, ferrite type, and plumbic acid type pigments.

The present composition has a pigment volume concentration (PVC) of 37 to 47%, preferably 40 to 46%. When the PVC is in the range, the composition having an excellent drying property is obtained, and a coating film which is excellent in adhesion to a substrate (particularly, e.g. nonferrous metal) and in which blisters and cracks are suppressed can be obtained.

When the PVC is less than 37%, the drying property of the composition is deteriorated, and the adhesion of an obtained coating film to a substrate (particularly, e.g. nonferrous metal) is deteriorated by cure shrinkage stress. When the PVC is more than 47%, the film-formation property of a formed coating film is deteriorated, thereby deteriorating adhesion to a substrate (particularly, e.g. nonferrous metal).

The PVC is can be specifically determined based on the following equation:

PVC[%]=total volume of all pigments in coating composition×100/total volume of non-volatile content in coating composition Commonly, the non-volatile content of a coating composition can be calculated by measuring a heating residue according to JIS K 5601-1-2 (heating temperature: 125° C., heating time: 60 minutes).

In addition, PVC can be calculated by separating a pigment component and other components from each other on the basis of the obtained heating residue and measuring the masses and true densities of the separated pigment component and other components.

<Optional Components>

The present composition may further contain other optional components than the epoxy resin (A), the amine curing agent (B), the silane coupling agent (C), the water (D), and the pigment (E), for example, a curing accelerator (F), a petroleum resin (plasticizer), a pigment dispersing agent, an anti-sagging agent, an anti-settling agent, a solvent, a reactive diluent, a thermoplastic resin (excluding petroleum resins), a curing agent other than the amine curing agent (B), an inorganic dehydrating agent (stabilizer), an antifouling agent, a dye, and another coating film formation component as long as the effects of the present invention are not impaired.

One kind of each of the optional components may be used singly, or two or more kinds thereof may be used.

<Curing Accelerator (F)>

The present composition preferably contains a curing accelerator (F) to further improve the cure rate and low-temperature curability of the composition.

The curing accelerator may be a conventionally known curing accelerator used in a coating, and is preferably, for example, a tertiary amine and an acrylic ester in view of, for example, being able to obtain a composition superior in cure rate and low-temperature curability.

The tertiary amine is not particularly limited, and examples thereof include triethanolamine, dialkylaminoethanol $\{[CH_3(CH_2)_n]_2NCH_2CH_2OH\}$, triethylenediamine [1,4-diazabicyclo(2,2,2)octane], and 2,4,6-tris(dimethylaminomethyl)phenol (for example, "Versamine EH30" (manufactured by BASF Japan Ltd.)). Of these, 2,4,6-tris(dimethylaminomethyl)phenol is preferred.

The acrylic ester is not particularly limited, but is preferably a polyfunctional acrylic ester. Examples of commercially available products thereof include "M-Cure 400" (manufactured by Sartomer, a functional group equivalent of 85 g/eq).

The curing accelerator (F) is preferably blended in an amount of 0.01 to 80 parts by weight, more preferably 0.01 to 50 parts by weight, with respect to 100 parts by weight of the epoxy resin (A).

A case in which the amount of the blended curing accelerator (F) is in the range is preferred because of further improving the cure rate and low-temperature curability of the obtained composition.

<Petroleum Resin>

The present composition may contain a petroleum resin as a plasticizer in view of, for example, the possibility of easy adjustment of the viscosity of the present composition, and the possibility of easy adjustment of the hardness of an obtained coating film.

The petroleum resin is not particularly limited, and examples thereof include a polymer containing, as a main raw material, a fraction obtained as a by-product by petroleum refining. Specific examples thereof include aromatic petroleum resins obtained by polymerizing a $C_9$ fraction such as a styrene derivative, indene, or vinyl toluene in heavy oil obtained as a by-product by the decomposition of petroleum naphtha, aliphatic petroleum resins obtained by polymerizing a $C_5$ fraction such as 1,3-pentadiene or isoprene, copolymer type petroleum resins obtained by copolymerizing the $C_9$ fraction and the $C_5$ fraction, aliphatic petroleum resins obtained by the cyclopolymerization of a part of a conjugated diene of a $C_5$ fraction such as cyclopentadiene or 1,3-pentadiene, resins obtained by hydrogenating these petroleum resins, and alicyclic petroleum resins obtained by polymerizing dicyclopentadiene.

Of these, the resins obtained by polymerizing the $C_9$ fraction are preferred because of having excellent compatibility with the epoxy resin (A) and the amine curing agent (B).

The petroleum resin is preferably blended in an amount of 0.1 to 100 parts by weight, more preferably 0.1 to 50 parts by weight, with respect to 100 parts by weight of the epoxy resin (A).

When the amount of the blended petroleum resin is in the range, the viscosity of the present composition can be easily adjusted, and the hardness of an obtained coating film can be easily adjusted.

<Anti-Sagging Agent>

Since the present composition contains a predetermined amount of water, the present composition has excellent coating workability, sagging of a coated substance is inhibited even when the composition is used and thickly coated, and the present composition enables the easy formation of a coating film having a desired film thickness. Because of having such effects, the present composition is inhibited from sagging, can be thickly coated, and has excellent coating workability even if an anti-sagging agent which can cause the deterioration of storage stability and interlayer peeling in a layered body, particularly interlayer peeling in a layered body in the case of forming a coating film by recoating the present composition, is not used.

Such a composition having excellent storage stability, being able to inhibit interlayer peeling in a layered body and to sag, being able to thick coating application, and excellent coating workability (the present composition containing no anti-sagging agent) is a composition having prominent effects which have not conventionally existed.

The present composition exhibits the effects even if using no anti-sagging agent. However, the present composition may use an anti-sagging agent as desired unless the effects of the present invention are impaired.

Examples of the anti-sagging agent include amide wax compounds, hydrogenated castor oil wax compounds, polyamide wax compounds, inorganic bentonite compounds, synthetic pulverized silica, and mixtures thereof, and polyamide wax and synthetic pulverized silica are preferred.

Examples of commercially available products thereof include "DISPARLON 6650" and "DISPARLON A630-20XC" manufactured by Kusumoto Chemicals, Ltd., and "ASAT-250F" manufactured by Itoh Oil Chemicals Co., Ltd.

The anti-sagging agent is preferably blended in an amount of 0.1 to 10 parts by weight, more preferably 0.1 to 5 parts by weight, with respect to 100 parts by weight of the epoxy resin (A).

<Solvent>

The present composition may contain a solvent.

As the solvent, a conventionally known solvent having a wide range of boiling points can be used. Specific examples thereof include solvents such as: aliphatic solvents such as mineral spirits; aromatic solvents such as toluene and xylene; alcohol solvents such as isopropyl alcohol, n-butyl alcohol, and isobutyl alcohol; ester solvents such as ethyl acetate and butyl acetate; ketone solvents such as methyl ethyl ketone, methyl isobutyl ketone (MIBK), and methyl amyl ketone; and ether or ether ester solvents such as ethylene glycol monomethyl ether, ethylene glycol monobutyl ether, propylene glycol monomethyl ether, and propylene glycol monomethyl ether acetate. Preferred examples thereof include xylene, isopropyl alcohol, n-butyl alcohol, methyl isobutyl ketone, ethylene glycol monomethyl ether, ethylene glycol monobutyl ether, and propylene glycol monomethyl ether.

The solvent is typically blended in an amount of preferably 0.1 to 80% by weight, more preferably 0.1 to 50% by weight, in the present composition, in consideration of, for example, the coating workability of the present composition, without particular limitations.

In the case of using commercially available products as the epoxy resin (A) and the curing agent, the amount of the blended solvent is the total weight of components except solvents (diluents) which may be contained in the commercially available products.

<Method of Preparing Present Composition>

The present composition can be prepared by mixing the components (A) to (E) so that the amounts of the water and the PVC are in certain ranges.

The composition of which the PVC is in the certain range can be prepared, for example, as described below.

(1) The blending amount (g) of the epoxy resin (A) is set so that the total of the composition is 100 g, and the blending amounts (g) of the amine curing agent (B) and the silane coupling agent (C) corresponding to the blending amount in consideration of, for example, a reaction ratio.

(2) The kind of the pigment (E) to be blended is determined, and the blending amount (g) of the pigment is determined depending on PVC (37 to 47%) on the basis of the density of the pigment (E), and the densities and blending amounts of the epoxy resin (A), the amine curing agent (B), and the silane coupling agent (C).

The form of the present composition is not particularly limited, but may be a two-component-type or three-component-type composition. Particularly, a three-component-type composition comprising a base component containing the epoxy resin (A), a curing agent component containing the amine curing agent (B), and a third component containing the water (D) is preferred in view of, for example, a composition excellent in, for example, storage stability, storage easiness and formability of a coating film, and being able to easy obtain a coating film having the excellent physical properties. In particular, when the third component contains the water (D), a solvent which can be mixed in an optional amount with water can be used in combination to prevent freezing in a winter season and to obtain coating workability suitable for the coating composition. Among the solvents, examples of such solvents include alcohol solvents having 1 to 3 carbon atoms, such as isopropyl alcohol; and ether solvents such as ethylene glycol monomethyl ether, ethylene glycol monobutyl ether, and propylene glycol monomethyl ether.

In the two-component-type or three-component-type composition, the pigment (E) may be contained in either or both of the base component and the curing agent component. A case in which the pigment (E) is contained in the base component is preferred because of resulting in the obtainment of a composition excellent in, for example, manufacturability of the composition, and easiness of kneading/stirring each component and storage stability in the case of using the composition.

In the two-component-type or three-component-type composition, the silane coupling agent (C) may be contained in any one component, any two components, or all the components of the base component, the curing agent component, and the third component.

Each of the base component, the curing agent component, and the third component can be produced by, e.g., stirring/mixing components to be blended in each of the components. The present composition can be produced by, e.g., stirring/mixing the base component, the curing agent component, and the third component prepared in advance. When the present composition is a three-component-type composition, specifically, it is preferable to, e.g., stir/mix the base component and the curing agent component just before coating application, and to, e.g., adjust and stir/mix the mixture and the third component so that the content of the water (D) in the coating composition is the predetermined amount.

A conventionally known mixing/stirring apparatus such as a paint shaker, a high-speed disperser, a sand grind mill, a basket mill, a ball mill, a triple roll mill, a Ross mixer, or a planetary mixer may be used for the stirring/mixing.

<Applications of Present Composition>

The present composition can be used in various applications without particular limitations. However, the present composition has the effects described above, and is therefore preferably used as a primer composition, particularly as a composition used on a nonferrous metal or stainless steel substrate, and further as a primer composition used on a propeller.

Since the present composition exhibits favorable adhesion and a favorable anticorrosion property particularly for a nonferrous metal and stainless steel, use of a nonferrous metal or stainless steel substrate as the substrate is preferred in view of being able to exhibit the effects of the present invention more effectively.

Examples of the nonferrous metal include copper, copper alloys {for example, bronze, aluminum bronze, nickel-aluminum bronze, manganese bronze, brass, copper-zinc alloy, and beryllium copper}, aluminum, aluminum alloys, nickel alloys (for example, nickel-chromium), and titanium alloys. Such nonferrous metals also encompass plated metals. In other words, the nonferrous metals also encompass metals in which surfaces with which the present composition comes in contact are metals other than steel materials.

Examples of the plated metals include steel plates plated with tin (tin plates), and steel plates plated with zinc (such as galvanized sheet iron and zinc-coated steel).

The stainless steel is an alloy steel containing iron (Fe) as a main component (50% or more) and 10.5% or more of chromium (Cr), and specific examples thereof include SUS304 (austenitic stainless steel) and SUS430 (ferritic stainless steel).

Specific examples of the substrate include underwater structures, ships, and fishing gears. A propeller is preferred as the substrate.

The material of the propeller is, for example, a copper alloy such as high-strength brass cast (JIS designation CAC301) or aluminum bronze cast (JIS designation CAC703); aluminum; or stainless steel.

«Primer Coating Film (P)»

A primer coating film (P) according to one embodiment of the present invention is not particularly limited as long as being a coating film produced using the present composition. The primer coating film (P) is preferably a substrate with a primer coating film (P), formed by a method including a step of forming a primer coating film (P) on a surface of a substrate from the present composition, and specifically preferably a substrate with a primer coating film (P), obtained by applying, drying, and curing the present composition on a substrate.

The primer coating film (P) is excellent in the balance of, for example, hardness, adhesion to a substrate (particularly, e.g. nonferrous metal) and long-term anticorrosion property, and is also excellent in adhesion to an antifouling coating film (Q) described later, because of being formed from the present composition.

In addition, the present composition enables the easy formation of a desired coating film at low temperature in a short time because of having an excellent drying property and being able to be dried at low temperature.

Examples of the substrate include substrates similar to the substrates described in the section of the applications of the present composition.

The substrate is preferably a substrate of which a surface is treated in advance by, for example, a sand blasting method, a friction method, and a method in which an oil component and powder dusts are removed by degreasing to further improve adhesion between the substrate and the present composition.

As a method of applying the present composition, which is not particularly limited, a conventionally known coating method can be adopted.

The coated composition may be force-dried by heating or blowing as desired, and be cured. However, the coated composition is typically dried and cured under natural conditions, because the composition has an excellent drying property and can be dried at low temperature.

The practical hardness of the primer coating film (P) is selected depending on an application as appropriate, and is preferably a pencil hardness of 3B to 6H, and more preferably 3B to 4H.

A case in which the primer coating film has such a hardness is preferred because the coating film can sufficiently endure actual use and has excellent durability.

The film thickness of the primer coating film (P) may be adjusted as appropriate depending on a desired application, and is preferably 50 to 300 μm, and more preferably 70 to 150 μm.

«Layered Antifouling Coating Film»

A layered antifouling coating film according to one embodiment of the present invention includes the primer coating film (P) and an antifouling coating film (Q) formed on the primer coating film (P).

The present composition is suitable for producing the layered antifouling coating film, and the layered antifouling coating film can prevent the corrosion and fouling of a substrate, particularly e.g. nonferrous metal, and further a propeller, for a long period. Specifically, it can be expected to prevent aquatic organisms such as sea lettuce, barnacle, green laver, serpula, oyster, and bryozoan from adhering to a substrate surface, particularly surfaces of e.g. nonferrous metal, for a long period.

Such a layered antifouling coating film is preferably formed on a substrate. Specifically, such a layered antifouling coating film is preferably formed by a method including a step of forming a primer coating film (P) from the present composition and a step of forming an antifouling coating film (Q) on the primer coating film (P).

Examples of the substrate include substrates similar to the substrates described as examples in the section of the applications of the present composition.

The antifouling coating film (Q) is not particularly limited, and may be a self-polishing-type antifouling coating film containing an antifouling agent. However, in the case of using a propeller as a substrate and using a self-polishing-type antifouling coating film as the antifouling coating film (Q), wearing of the antifouling coating film (Q) is accelerated by the high-speed rotation of the propeller, and a problem may occur in view of a long-term antifouling property. In addition, such a propeller is often used without a lapse of sufficient drying time after coating. Therefore, a silicone resin antifouling coating film which allows the toughness of a coating film to be easily obtained and which exhibits a long-term antifouling property even without containing an antifouling agent is preferred as the antifouling coating film (Q) in the case of forming the layered antifouling coating film on a propeller surface.

Examples of the silicone resin antifouling coating film include a film formed using a silicone resin-containing composition containing an organopolysiloxane having at least two condensation-reactive functional groups, and more specific examples thereof include films formed using conventionally known compositions described in, for example, JP 2001-139816 A and JP 2001-181509 A.

Specifically, a curable composition containing an organopolysiloxane (I) having condensation-reactive functional groups at both terminals of the molecule and hydrophobic silica (II), in which the hydrophobic silica (II) is silica obtained by being heat-treated with the organopolysiloxane (I), is preferred as the silicone resin-containing composition.

The organopolysiloxane (I) is preferably a compound represented by the following Formula [α] in view of, for example, being able to obtain an antifouling coating film having excellent adhesion to the primer coating film (P).

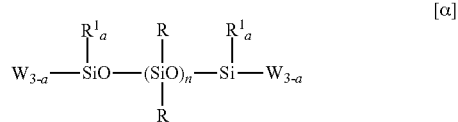

In Formula [α], W independently represents a hydroxyl group or a hydrolyzable group, $R^1$ and R each independently represent unsubstituted or substituted monovalent hydrocarbon groups having 1 to 12 carbon atoms, n represents an integer of 5 or more, and a represents 0, 1, or 2. Examples of the monovalent hydrocarbon groups include straight- or branched-chain alkyl groups, alkenyl groups, aryl groups, cycloalkyl groups, and aralkyl groups.

In addition, the silicone resin-containing composition preferably contains: the organopolysiloxane (I) in which W in Formula [α] is a ketoxime group and a represents 1; and the hydrophobic silica (II).

The antifouling coating film (Q) may be formed, for example, by applying a composition that enables the formation of the antifouling coating film (Q), preferably on the primer coating film (P), by a conventionally known method, and then be force-dried by heating and blowing as desired, and be cured. Typically, the antifouling coating film (Q) may be formed by drying and curing under natural conditions.

The film thickness of the antifouling coating film (Q) may be adjusted depending on a desired application as appropriate, and is preferably 50 to 300 μm, and more preferably 70 to 150 μm.

EXAMPLES

The present invention will be more specifically described below with reference to Examples. However, the present invention is not limited to the following Examples at all. Unless otherwise specified, "part(s)" in the following Examples and Comparative Examples represents part(s) by weight.

Raw materials used in the following Examples and Comparative Examples are set forth in the following Table 1.

[Drying Property]

Each of the coating compositions was applied to a glass sheet of 348 mm×25 mm×2 mm in thickness by a film applicator so that a dry coating film thickness was 150 μm. A time until the coating film was semi-cured or completely

TABLE 1

| | Trade name | Supplier | Content | Remarks |
|---|---|---|---|---|
| Epoxy resin (A) | jER-834-X90 | Mitsubishi Chemical Corporation | Semisolid bisphenol A type epoxy resin | Solid content of 90%, epoxy equivalent of 250 g/eq |
| | Epiclon 5300-70 | DIC Corporation | Novolac type epoxy resin | Solid content of 70%, epoxy equivalent of 320 g/eq |
| Amine curing agent (B) | MAD-204(A) | OHTAKE MEISHIN CHEMICAL, CO., LTD. | Mannich modified product of m-xylylenediamine | Solid content of 65%, active hydrogen equivalent of 131 g/eq |
| | Luckamide V6-221 | DIC Corporation | Mannich modified product of m-xylylenediamine | Active hydrogen equivalent of 80 g/eq |
| | Ancamine 2143 | Air Products and Chemicals, Inc. | Epoxy resin adduct modified product of 4,4'-methylenebiscyclohexylamine | Active hydrogen equivalent of 115 g/eq |
| | Luckamide TD-966 | DIC Corporation | Polyamideamine | Solid content of 60%, active hydrogen equivalent of 226 g/eq |
| Silane coupling agent (C) | KBM-403 | Shin-Etsu Chemical Co., Ltd. | γ-glycidoxypropyltrimethoxysilane | Epoxy equivalent of 236 g/eq |
| | KBE-903 | Shin-Etsu Chemical Co., Ltd. | γ-aminopropyltriethoxysilane | Active hydrogen equivalent of 111 g/eq |
| | KBP-90 | Shin-Etsu Chemical Co., Ltd. | Aqueous aminosilane solution | Solid content of 32%, active hydrogen equivalent of 118 g/eq |
| Pigment (E) | Calcined Plaster FT-2 | NORITAKE CO., LIMITED | Hemihydrate gypsum (extender pigment) | — |
| | TTK Talc | TAKEHARA KAGAKU KOGYO CO., LTD. | Talc (extender pigment) | — |
| | Mica Powder 325 mesh | Fukuoka Talc Co., Ltd. | Mica (extender pigment) | — |
| | Tarox LL-XLO | Titan Kogyo, Ltd. | Yellow iron oxide (coloring pigment) | — |
| Curing accelerator (F) | M-Cure 400 | Sartomer | Mixture of polyfunctional acryl ester | Functional group equivalent of 85 g/eq |
| | Versamine EH30 | BASF Japan Ltd. | 2,4,6-tris(dimethylaminomethyl)phenol | Tertiary amine |
| Petroleum resin | Hreinol PL-1000S | Kolon Chemical | Phenol modified aromatic hydrocarbon resin | Solid content of 97% |
| Anti-sagging agent | Disparlon 6650 | Kusumoto Chemicals, Ltd. | Amide wax | — |

Examples 1 to 24 and Comparative Examples 1 to 9

Components of which the kinds are set forth in the following Tables 2 and 3 were mixed in amounts (part (s)) in the tables, and each base component, each curing agent component, and each third component were prepared.

In the following description, the following evaluations were performed using a coating composition obtained by mixing the base component, the curing agent component, and the third component just before use. Although the following coating film was intended to be formed using each of coating compositions obtained in Comparative Examples 4 and 5, it was impossible to obtain a continuous, homogeneous coating film (coating film scission).

[Non-Volatile Content and PVC in Coating Composition]

The non-volatile content of the coating composition was calculated based on a heating residue measured according to JIS K 5601-1-2 (heating temperature: 125° C., heating time: 60 minutes). The non-volatile content represents a value equivalent to the total of the solid contents (components other than a solvent) of raw material components used in the coating composition.

In addition, a pigment component and the other components were separated from each other on the basis of the obtained heating residue, and PVC was calculated by measuring the respective masses and true densities of the pigment component and the other components separated from each other.

cured was measured using an RC type drying time recorder (manufactured by Coating Tester) at each temperature of 23° C. or 5° C.

In the drying property test, the test needle of the RC type drying time recorder was slowly moved on an undried coating film at a constant speed, thereby determining the state of the coating film on the basis of the track of the test needle and determining a time until the coating film was semi-cured or completely cured. A schematic view illustrating a time until semi-curing or complete-curing is illustrated in FIG. 1.

Specifically, a time until the glass sheet was not seen in the track of the test needle, as indicated by semi-curing 10 in FIG. 1, was regarded as the time until the semi-curing, while a time until the test needle slipped on the coating film surface and the mark of the test needle completely vanished, as indicated by complete-curing 20 in FIG. 1, was regarded as the time until the complete-curing.

In a case in which the complete-curing time at 5° C. is 12 hours or less, a drying property can be considered to have no practical problem.

[Coating Film Hardness]

Each of the coating compositions was applied to a tin plate of 200 mm×200 mm×0.3 mm in thickness by a film applicator so that a dry coating film thickness was 150 μm. The coating composition was dried at each temperature of 23° C. or 5° C. for 24 hours, followed by measuring the pencil hardness of the coating film according to the standard of JIS K 5600-5-4 (1999) and evaluating the hardness of the coating film.

In a case in which pencil hardness at 5° C. is "3B" or more, coating film hardness can be considered to have no practical problem.

[Anti-Sagging Property]

Immediately after an application of each of the coating compositions to a tin plate of 200 mm×200 mm×0.3 mm in thickness at 23° C. by using a box-type sag tester (having a gap of 300 μm, 400 μm, or 500 μm) described in JIS K 5400 (1990) 6.4 on a horizontal table, the tin plate is allowed to vertically stand so that the track line of the sag tester is horizontal. The anti-sagging property of the coating film was examined. A case in which the composition flowing out into a space (3 mm) between coating layers formed by each gap of the sag tester did not reach ½ of the distance of the space (a case in which the length of sagging from a coating layer formed by the sag tester was less than 1.5 mm) was evaluated as occurrence of no sagging (good), while a case in which the composition reached ½ of the distance of the space was evaluated as occurrence of sagging (poor).

In a case in which no sagging occurs in a gap of 400 μm in the sag tester, an anti-sagging property can be considered to have no practical problem.

[Cathodic Protection Adhesion Test]
[Single-Film Test Panel]

Columnar zinc for corrosion prevention of 2 cm in diameter×1 cm in height was attached to each substrate of 150 mm×70 mm×10 mm in thickness (manufactured by Nippon Testpanel Co., Ltd.) made of brass, stainless steel (SUS304), or aluminum through a lead wire (made of copper), and each obtained test piece was spray-coated with each of the coating compositions so that a dry coating film thickness was 100 μm. The coating composition was dried at 23° C. for 24 hours to produce an cathodic protection adhesion test panel with a single film.

[Test Panel of Layered Antifouling Coating Film]

Each of test pieces similar to above-described test panels was spray-coated with each of the coating compositions so that a dry coating film thickness was 100 μm. The coating composition was dried at 23° C. for 24 hours, and the dried coating film was then spray-coated with a silicone resin-containing antifouling coating composition so that a dry coating film thickness was 100 μm. The antifouling coating composition was dried at 23° C. for 24 hours to produce a cathodic protection adhesion test panel with a layered antifouling coating film.

The silicone resin-containing antifouling coating composition was prepared by mixing 100 parts of organopolysiloxane "KE-45" (manufactured by Shin-Etsu Chemical Co., Ltd.), 30 parts of silicone oil "DOW CORNING TORAY SH550 FLUID" (manufactured by Dow Corning Toray Co., Ltd.), and 30 parts of xylene.

[Test]

Each of the obtained cathodic protection adhesion test panels with a single film or a layered antifouling coating film was immersed in salt water (3%) at 40° C. for 3 months (cathodic protection 3M). The coating film surface of each immersed test panel was washed with water and dried at 23° C. for 24 hours, followed by confirming the adhesion of the coating film.

The adhesion was basically in conformity with JIS K 5600-5-6 (1999). The adhesion was conducted a cross hatch test (cross cut method) with 25 squares of 2 mm×2 mm to evaluate the adhesion on the basis of the number of the remaining squares of a coating film remaining on the substrate, without depending on a dry film thickness. For example, a case in which the number of remaining squares was 20 was expressed as 20/25.

The number of the remaining squares of the coating film is a value obtained by converting, into the number of squares, the total of the area of the coating film remaining on the substrate with respect to the overall area cut into a hatch form of 25 squares. For example, in a case in which the total area of a coating film remaining on a substrate is 80 mm², the number of remaining squares is expressed as 20/25. For example, in a case in which the total area of a coating film remaining on a substrate is a value that is not divisible by 4, such as 75 mm², the number of remaining squares is expressed as 19/25 which is obtained by rounding off the value.

In a case in which the number of the remaining squares is "20/25" or more, adhesion can be considered to have no practical problem.

TABLE 2

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Base Component | jER-834-X90 | 19 | 19 | 19 | 19 | 19 | 19 | 19 | 19 | 19 | 21 |
|  | Epiclon 5300-70 | | | | | | | | | | |
|  | Hirenol PL-1000S | | | | | | | | | | |
|  | M-Cure 400 | | | | | | | | | | |
|  | Calcined Plaster FT-2 | | | | | | | | | | |
|  | TTK Talc | 33 | 33 | 33 | 33 | 33 | 33 | 33 | 33 | 33 | 31 |
|  | Mica Powder 325 mesh | 6 | 6 | 6 | 6 | 6 | 6 | 6 | 6 | 6 | 6 |
|  | Tarox LL-XLO | 2 | 2 | 2 | 2 | 2 | 2 | 2 | 2 | 2 | 2 |
|  | KBM-403 | 1 | 1 | 1 | 1 | 1 | 1 | 1 | 1 | 1 | 1 |
|  | Disparlon 6650 | 0.5 | 0.5 | 0.5 | 0.5 | 0.5 | 0.5 | 0.5 | | | 0.5 |
|  | Xylene | 17.5 | 17.5 | 17.5 | 17.5 | 17.5 | 17.5 | 17.5 | 18 | 18 | 17.5 |
|  | N-Butyl Alcohol | 3 | 3 | 3 | 3 | 3 | 3 | 3 | 3 | 3 | 3 |
|  | MIBK | 3 | 3 | 3 | 3 | 3 | 3 | 3 | 3 | 3 | 3 |
|  | (Subtotal) | 85 | 85 | 85 | 85 | 85 | 85 | 85 | 85 | 85 | 85 |
| Curing agent component | MAD-204(A) | 10 | 10 | 10 | 10 | 10 | 10 | 10 | 10 | 10 | 12 |
|  | Luckamide V6-221 | | | | | | | | | | |
|  | Ancamine 2143 | | | | | | | | | | |
|  | Luckamide TD-966 | | | | | | | | | | |
|  | KBE-903 | | | | | | | | | | |

TABLE 2-continued

|  |  | | | | | | | | | | |
|---|---|---|---|---|---|---|---|---|---|---|---|
|  | Versamine EH30 | 0.1 | 0.1 | 0.1 | 0.1 | 0.1 | 0.1 | 0.1 | 0.1 | 0.1 | 0.1 |
|  | Xylene | 3 | 3 | 3 | 3 | 3 | 3 | 3 | 3 | 3 | 1 |
|  | N-Butyl Alcohol | 1.9 | 1.9 | 1.9 | 1.9 | 1.9 | 1.9 | 1.9 | 1.9 | 1.9 | 1.9 |
|  | (Subtotal) | 15 | 15 | 15 | 15 | 15 | 15 | 15 | 15 | 15 | 15 |
| Third component | Water | 2.5 | 3 | 3.5 | 4 | 5 | 6 | 6.5 | 2.5 | 5 | 5 |
|  | KBP-90 |  |  |  |  |  |  |  |  |  |  |
|  | Propylene Glycol Methyl Ether |  |  |  |  |  |  |  |  |  |  |
|  | Iso Propyl Alcohol |  |  |  |  |  |  |  |  |  |  |
|  | (Subtotal) | 2.5 | 3 | 3.5 | 4 | 5 | 6 | 6.5 | 2.5 | 5 | 5 |
| Coating composition | [Total] | 102.5 | 103 | 103.5 | 104 | 105 | 106 | 106.5 | 102.5 | 105 | 105 |
|  | Non-volatile content [%] | 64.6 | 64.3 | 64.0 | 63.7 | 63.0 | 62.5 | 62.2 | 64.1 | 62.6 | 64.1 |
|  | PVC [%] | 42.4 | 42.4 | 42.4 | 42.4 | 42.4 | 42.4 | 42.4 | 41.6 | 41.6 | 38.4 |
|  | Reaction ratio | 0.7 | 0.7 | 0.7 | 0.7 | 0.7 | 0.7 | 0.7 | 0.7 | 0.7 | 0.8 |
|  | Amount of water (with respect to epoxy resin) | 14.6 | 17.5 | 20.5 | 23.4 | 29.2 | 35.0 | 38.0 | 14.6 | 29.2 | 26.5 |
|  | Amount of water (with respect to non-volatile content) | 3.9 | 4.7 | 5.5 | 6.3 | 7.9 | 9.6 | 10.5 | 3.9 | 8.0 | 7.8 |
| Drying property | 23° C. Semi-curing (h) | 3.5 | 3.5 | 2.5 | 2.5 | 2 | 1.5 | 1.5 | 3.5 | 2 | 3 |
|  | Complete-curing (h) | 6 | 6 | 6 | 5 | 4.5 | 4.5 | 3 | 6 | 4.5 | 6 |
|  | 5° C. Semi-curing (h) | 4 | 3.5 | 3.5 | 3 | 3 | 2.5 | 2.5 | 4 | 3 | 4 |
|  | Complete-curing (h) | 12 | 11 | 10 | 9 | 9 | 8 | 8 | 12 | 9 | 11 |
| Coating film hardness | After drying at 23° C. for 24 h | HB | HB | H | H | H | H | H | B | H | H |
|  | After drying at 5° C. for 24 h | 3B | 3B | 3B | 2B | 2B | 2B | 2B | 3B | 2B | 2B |
| Anti-sagging property | Sag tester gap 300 μm | Good | Good | Good | Good | Good | Good | Good | Good | Good | Good |
|  | 400 μm | Good | Good | Good | Good | Good | Good | Good | Good | Good | Good |
|  | 500 μm | Poor | Poor | Good | Good | Good | Good | Good | Poor | Good | Good |
| Adhesion Single film | Brass Cathodic protection 3M | 22/25 | 23/25 | 22/25 | 24/25 | 25/25 | 25/25 | 25/25 | 22/25 | 24/25 | 23/25 |
|  | Stainless steel Cathodic protection 3M | 20/25 | 21/25 | 20/25 | 22/25 | 23/25 | 24/25 | 23/25 | 20/25 | 23/25 | 21/25 |
|  | Aluminum Cathodic protection 3M | 23/25 | 23/25 | 25/25 | 25/25 | 25/25 | 25/25 | 25/25 | 23/25 | 25/25 | 23/25 |
| Layered coating film | Brass Cathodic protection 3M | 22/25 | 21/25 | 22/25 | 21/25 | 25/25 | 25/25 | 25/25 | 21/25 | 25/25 | 21/25 |
|  | Stainless steel Cathodic protection 3M | 20/25 | 20/25 | 20/25 | 21/25 | 23/25 | 23/25 | 23/25 | 20/25 | 23/25 | 21/25 |
|  | Aluminum Cathodic protection 3M | 23/25 | 24/25 | 25/25 | 25/25 | 25/25 | 25/25 | 25/25 | 22/25 | 25/25 | 23/25 |

|  |  | Examples | | | Comparative Examples | | | | | | |
|---|---|---|---|---|---|---|---|---|---|---|---|
|  |  | 11 | 12 | 13 | 1 | 2 | 3 | 4 | 5 | 6 | 7 |
| Base Component | jER-834-X90 | 18 | 19 | 19 | 19 | 19 | 19 | 19 | 19 | 23 | 15 |
|  | Epiclon 5300-70 |  |  |  |  |  |  |  |  |  |  |
|  | Hirenol PL-1000S |  |  |  |  |  |  |  |  |  |  |
|  | M-Cure 400 |  |  |  |  |  |  |  |  |  |  |
|  | Calcined Plaster FT-2 |  |  |  |  |  |  |  |  |  |  |
|  | TTK Talc | 34 | 33 | 33 | 33 | 33 | 33 | 33 | 33 | 29 | 35 |
|  | Mica Powder 325 mesh | 6 | 6 | 6 | 6 | 6 | 6 | 6 | 6 | 6 | 6 |
|  | Tarox LL-XLO | 2 | 2 | 2 | 2 | 2 | 2 | 2 | 2 | 2 | 2 |
|  | KBM-403 | 1 | 1 | 1 | 1 | 1 | 1 | 1 | 1 | 1 | 1 |
|  | Disparlon 6650 | 0.5 | 0.5 | 0.5 | 0.5 |  | 0.5 | 0.5 | 0.5 | 0.5 | 0.5 |
|  | Xylene | 17.5 | 17.5 | 17.5 | 17.5 | 18 | 17.5 | 17.5 | 17.5 | 17.5 | 19.5 |
|  | N-Butyl Alcohol | 3 | 3 | 3 | 3 | 3 | 3 | 3 | 3 | 3 | 3 |
|  | MIBK | 3 | 3 | 3 | 3 | 3 | 3 | 3 | 3 | 3 | 3 |
|  | (Subtotal) | 85 | 85 | 85 | 85 | 85 | 85 | 85 | 85 | 85 | 85 |
| Curing agent component | MAD-204(A) | 8 | 10 | 10 | 10 | 10 | 10 | 10 | 10 | 13 | 8 |
|  | Luckamide V6-221 |  |  |  |  |  |  |  |  |  |  |
|  | Ancamine 2143 |  |  |  |  |  |  |  |  |  |  |
|  | Luckamide TD-966 |  |  |  |  |  |  |  |  |  |  |
|  | KBE-903 |  |  |  |  |  |  |  |  |  |  |
|  | Versamine EH30 | 0.1 | 0.1 | 0.1 | 0.1 | 0.1 | 0.1 | 0.1 | 0.1 | 0.1 | 0.1 |
|  | Xylene | 5 | 3 | 3 | 3 | 3 | 3 | 3 | 3 |  | 5 |
|  | N-Butyl Alcohol | 1.9 | 1.9 | 1.9 | 1.9 | 1.9 | 1.9 | 1.9 | 1.9 | 1.9 | 1.9 |
|  | (Subtotal) | 15 | 15 | 15 | 15 | 15 | 15 | 15 | 15 | 15 | 15 |
| Third component | Water | 5 | 4 | 4 | 0 | 0 | 2 | 7 | 10 | 5 | 5 |
|  | KBP-90 |  |  |  |  |  |  |  |  |  |  |
|  | Propylene Glycol Methyl Ether |  | 1 |  |  |  |  |  |  |  |  |
|  | Iso Propyl Alcohol |  |  | 1 |  |  |  |  |  |  |  |
|  | (Subtotal) | 5 | 5 | 5 | 0 | 0 | 2 | 7 | 10 | 5 | 5 |
| Coating composition | [Total] | 105 | 105 | 105 | 100 | 100 | 102 | 107 | 110 | 105 | 105 |
|  | Non-volatile content [%] | 61.9 | 63.0 | 63.0 | 66.2 | 65.7 | 64.9 | 61.9 | 60.2 | 64.5 | 60.3 |

TABLE 2-continued

| | | | | | | | | | | | | |
|---|---|---|---|---|---|---|---|---|---|---|---|---|
| | PVC [%] | | 45.3 | 42.4 | 42.4 | 42.4 | 41.6 | 42.4 | 42.4 | 42.4 | 35.2 | 49.0 |
| | Reaction ratio | | 0.6 | 0.7 | 0.7 | 0.7 | 0.7 | 0.7 | 0.7 | 0.7 | 0.8 | 0.7 |
| | Amount of water (with respect to epoxy resin) | | 30.9 | 23.4 | 23.4 | 0.0 | 0.0 | 11.7 | 40.9 | 58.5 | 24.2 | 37.0 |
| | Amount of water (with respect to non-volatile content) | | 8.1 | 6.3 | 6.3 | 0.0 | 0.0 | 3.1 | 11.3 | 16.6 | 7.7 | 8.3 |
| Drying property | 23° C. | Semi-curing (h) | 2 | 2 | 2 | 4 | 4 | 4 | Coating film scission | | 4 | 1 |
| | | Complete-curing (h) | 4 | 4.5 | 4.5 | 7 | 7 | 6 | | | 6 | 3 |
| | 5° C. | Semi-curing (h) | 2.5 | 3 | 3 | 6 | 6 | 5 | | | 5 | 2.5 |
| | | Complete-curing (h) | 8 | 9 | 9 | 18 | 18 | 16 | | | 13 | 8 |
| Coating film hardness | After drying at 23° C. for 24 h | | H | H | H | B | B | B | | | HB | H |
| | After drying at 5° C. for 24 h | | 2B | 2B | 2B | 4B | 4B | 4B | | | 3B | 2B |
| Anti-sagging property | Sag tester gap | 300 μm | Good | Good | Good | Good | Poor | Good | | | Good | Good |
| | | 400 μm | Good | Good | Good | Poor | Poor | Poor | | | Good | Good |
| | | 500 μm | Good | Good | Good | Poor | Poor | Poor | | | Good | Good |
| Adhesion | Single film | Brass | Cathodic protection 3M | 22/25 | 25/25 | 25/25 | 13/25 | 12/25 | 12/25 | | | 13/25 | 15/25 |
| | | Stainless steel | Cathodic protection 3M | 22/25 | 23/25 | 23/25 | 2/25 | 5/25 | 8/25 | | | 6/25 | 8/25 |
| | | Aluminum | Cathodic protection 3M | 25/25 | 25/25 | 25/25 | 11/25 | 11/25 | 13/25 | | | 15/25 | 14/25 |
| | Layered coating film | Brass | Cathodic protection 3M | 23/25 | 25/25 | 25/25 | 11/25 | 11/25 | 11/25 | | | 11/25 | 11/25 |
| | | Stainless steel | Cathodic protection 3M | 22/25 | 23/25 | 23/25 | 3/25 | 4/25 | 4/25 | | | 3/25 | 4/25 |
| | | Aluminum | Cathodic protection 3M | 25/25 | 25/25 | 25/25 | 9/25 | 13/25 | 15/25 | | | 12/25 | 11/25 |

TABLE 3

| | | Examples | | | | | | | | | | | | Comparative Examples | |
|---|---|---|---|---|---|---|---|---|---|---|---|---|---|---|---|
| | | 14 | 15 | 16 | 17 | 18 | 19 | 20 | 21 | 22 | 23 | 24 | 8 | 9 |
| Base component | jER-834-X90 | 9 | 19 | 19 | 17 | 19 | 19 | 19 | 19 | 19 | 19 | 19 | 19 | 19 |
| | Epiclon 5300-70 | 10 | | | | | | | | | | | | |
| | Hirenol PL-1000S | | | | | | | | | 2 | | | | |
| | M-Cure 400 | | | | | | | | | | 2 | | | |
| | Calcined Plaster FT-2 | | | | | | | | | | | 5 | 5 | |
| | TTK Talc | 33 | 33 | 33 | 35 | 33 | 33 | 33 | 33 | 33 | 33 | 28 | 28 | 33 |
| | Mica Powder 325mesh | 6 | 6 | 6 | 6 | 6 | 6 | 6 | 6 | 6 | 6 | 6 | 6 | 6 |
| | Tarox LL-XLO | 2 | 2 | 2 | 2 | 2 | 2 | 2 | 2 | 2 | 2 | 2 | 2 | 2 |
| | KBM-403 | 1 | 1 | 1 | 1 | | | 1 | 1 | 1 | 1 | 1 | 1 | |
| | Disparlon 6650 | 0.5 | 0.5 | 0.5 | 0.5 | 0.5 | 0.5 | 0.5 | 0.5 | 0.5 | 0.5 | 0.5 | 0.5 | 0.5 |
| | Xylene | 17.5 | 17.5 | 17.5 | 17.5 | 18.5 | 18.5 | 17.5 | 17.5 | 15.5 | 15.5 | 17.5 | 17.5 | 18.5 |
| | N-Butyl Alcohol | 3 | 3 | 3 | 3 | 3 | 3 | 3 | 3 | 3 | 3 | 3 | 3 | 3 |
| | MIBK | 3 | 3 | 3 | 3 | 3 | 3 | 3 | 3 | 3 | 3 | 3 | 3 | 3 |
| | (Subtotal) | 85 | 85 | 85 | 85 | 85 | 85 | 85 | 85 | 85 | 85 | 85 | 85 | 85 |
| Curing agent component | MAD-204(A) | 8 | 6 | | | 10 | 10 | 10 | 10 | 10 | 10 | 10 | 10 | 10 |
| | Luckamide V6-221 | | 2 | | | | | | | | | | | |
| | Ancamine 2143 | | | 6 | | | | | | | | | | |
| | Luckamide TD-966 | | | | 15 | | | | | | | | | |
| | KBE-903 | | | | | 1 | | | | | | | | |
| | Versamine EH30 | 0.1 | 0.1 | 0.1 | 0.1 | 0.1 | 0.1 | 0.1 | 0.1 | 0.1 | 0.1 | 0.1 | 0.1 | 0.1 |
| | Xylene | 5 | 5 | 7 | 0 | 2 | 3 | 3 | 3 | 3 | 3 | 3 | 3 | 3 |
| | N-Butyl Alcohol | 1.9 | 1.9 | 1.9 | 1.9 | 1.9 | 1.9 | 1.9 | 1.9 | 1.9 | 1.9 | 1.9 | 1.9 | 1.9 |
| | (Subtotal) | 15 | 15 | 15 | 17 | 15 | 15 | 15 | 15 | 15 | 15 | 15 | 15 | 15 |
| Third component | Water | 5 | 5 | 5 | 5 | 5 | 4 | 4 | 3.5 | 5 | 5 | 5 | 0 | 5 |
| | KBP-90 | | | | | | | | 1 | 1 | 1.5 | | | |
| | (Subtotal) | 5 | 5 | 5 | 5 | 5 | 5 | 5 | 5 | 5 | 5 | 5 | 0 | 5 |
| Coating composition | [Total] | 105 | 105 | 105 | 107 | 105 | 105 | 105 | 105 | 105 | 105 | 105 | 100 | 105 |
| | Non-volatile content [%] | 59.9 | 62.5 | 62.6 | 64.4 | 63.0 | 62.4 | 63.3 | 63.5 | 64.9 | 65.0 | 63.0 | 66.2 | 62.1 |
| | PVC [%] | 46.0 | 42.8 | 41.9 | 41.1 | 42.3 | 43.2 | 42.1 | 41.9 | 40.3 | 40.5 | 42.5 | 42.5 | 43.5 |
| | Reaction ratio | 0.7 | 0.8 | 0.7 | 0.8 | 0.7 | 0.8 | 0.8 | 0.8 | 0.7 | 0.5 | 0.7 | 0.7 | 0.7 |
| | Amount of water (with respect to epoxy resin) | 33.1 | 29.2 | 29.2 | 32.7 | 29.2 | 23.4 | 23.4 | 20.5 | 29.2 | 29.2 | 29.2 | 0.0 | 29.2 |
| | Amount of water (with respect to non-volatile content) | 8.3 | 8.0 | 8.0 | 7.8 | 7.9 | 7.5 | 7.4 | 7.1 | 7.7 | 7.7 | 7.9 | 0.0 | 8.1 |
| Drying property | 23° C. Semi-curing (h) | 1.5 | 2 | 3 | 2.5 | 2 | 2 | 2 | 2 | 3 | 1.5 | 2 | 4 | 3 |
| | Complete-curing (h) | 3 | 3 | 5.5 | 5 | 5 | 5 | 5 | 5 | 6 | 3 | 5 | 7 | 5 |
| | 5° C. Semi-curing (h) | 2.5 | 4 | 4 | 4 | 3 | 3.5 | 3.5 | 4 | 3.5 | 2 | 3 | 6 | 3 |

TABLE 3-continued

|  |  |  |  | Examples | | | | | | | | | | | Comparative Examples | |
|---|---|---|---|---|---|---|---|---|---|---|---|---|---|---|---|---|
|  |  |  |  | 14 | 15 | 16 | 17 | 18 | 19 | 20 | 21 | 22 | 23 | 24 | 8 | 9 |
|  |  |  | Complete-curing (h) | 8.5 | 10 | 11 | 9 | 9 | 9 | 9 | 10 | 10 | 7 | 8.5 | 17 | 9 |
| Coating film hardness |  |  | After drying at 23° C. for 24 h | H | H | HB | HB | HB | H | H | H | H | H | H | B | H |
|  |  |  | After drying at 5° C. for 24 h | 2B | 2B | 3B | 3B | 3B | 2B | 2B | 2B | 3B | 2B | 2B | 4B | 2B |
| Anti-sagging property | Sag tester gap | 300 μm |  | Good | Good | Good | Good | Good | Good | Good | Good | Good | Good | Good | Good | Good |
|  |  | 400 μm |  | Good | Good | Good | Good | Good | Good | Good | Good | Good | Good | Good | Poor | Good |
|  |  | 500 μm |  | Good | Good | Good | Good | Good | Good | Good | Good | Good | Good | Good | Poor | Good |
| Adhesion | Single film | Brass | Cathodic protection 3M | 25/25 | 25/25 | 21/25 | 22/25 | 22/25 | 24/25 | 24/25 | 25/25 | 23/25 | 23/25 | 23/25 | 21/25 | 11/25 |
|  |  | Stainless steel | Cathodic protection 3M | 24/25 | 24/25 | 21/25 | 21/25 | 23/25 | 23/25 | 24/25 | 25/25 | 22/25 | 21/25 | 22/25 | 15/25 | 7/25 |
|  |  | Aluminum | Cathodic protection 3M | 25/25 | 25/25 | 22/25 | 21/25 | 25/25 | 25/25 | 25/25 | 25/25 | 25/25 | 25/25 | 25/25 | 21/25 | 12/25 |
|  | Layered coating film | Brass | Cathodic protection 3M | 24/25 | 25/25 | 21/25 | 20/25 | 23/25 | 23/25 | 23/25 | 25/25 | 21/25 | 21/25 | 22/25 | 20/25 | 8/25 |
|  |  | Stainless steel | Cathodic protection 3M | 23/25 | 23/25 | 20/25 | 20/25 | 21/25 | 21/25 | 22/25 | 25/25 | 21/25 | 21/25 | 21/25 | 15/25 | 6/25 |
|  |  | Aluminum | Cathodic protection 3M | 25/25 | 25/25 | 21/25 | 22/25 | 24/25 | 24/25 | 24/25 | 25/25 | 23/25 | 25/25 | 24/25 | 19/25 | 9/25 |

The invention claimed is:

1. A method of producing a coating composition, the method comprising:
preparing
a base component comprising an epoxy resin,
a curing agent component comprising an amine curing agent, and
a third component comprising water, and
mixing
the base component, the curing agent component and the third component,
wherein:
the base component and/or the curing agent component comprises a pigment,
at least one of the base component, the curing agent component, and the third component comprises a silane coupling agent,
the coating composition comprises water in an amount of from 3.5 to 11 parts by weight with respect to 100 parts by weight of non-volatile content in the coating composition,
the coating composition comprises water in an amount of more than 20 parts by weight with respect to 100 parts by weight of the epoxy resin, and
a pigment volume concentration of the coating composition is from 37 to 47%.

2. The method of claim 1, wherein the silane coupling agent is a silane coupling agent having an epoxy group or an amino group.

3. The method of claim 1, wherein the coating composition comprises from 0.1 to 10% by weight of the silane coupling agent with respect to 100% by weight of the non-volatile content in the coating composition.

4. The method of claim 1, wherein the amine curing agent comprises a Mannich modified product.

5. The method of claim 1, wherein the coating composition further comprises a curing accelerator.

6. A method of producing a substrate with a primer coating film, the method comprising:
forming a primer coating film on a surface of the substrate with the coating composition produced by the method of claim 1.

7. A method of producing a substrate with a layered antifouling coating film, the method comprising:
forming a primer coating film on a surface of the substrate with the coating composition produced by the method of claim 1, and
forming an antifouling coating film on the primer coating film.

8. The method of claim 7, wherein the antifouling coating film is a silicone resin antifouling coating film.

9. The method of claim 6, wherein the substrate is a nonferrous metal or stainless steel.

10. The method of claim 6, wherein the substrate is a ship propeller.

* * * * *